F. H. SLEEPER.
SPRING WINDING MACHINE.
APPLICATION FILED MAY 24, 1918.
1,368,297.
Patented Feb. 15, 1921.
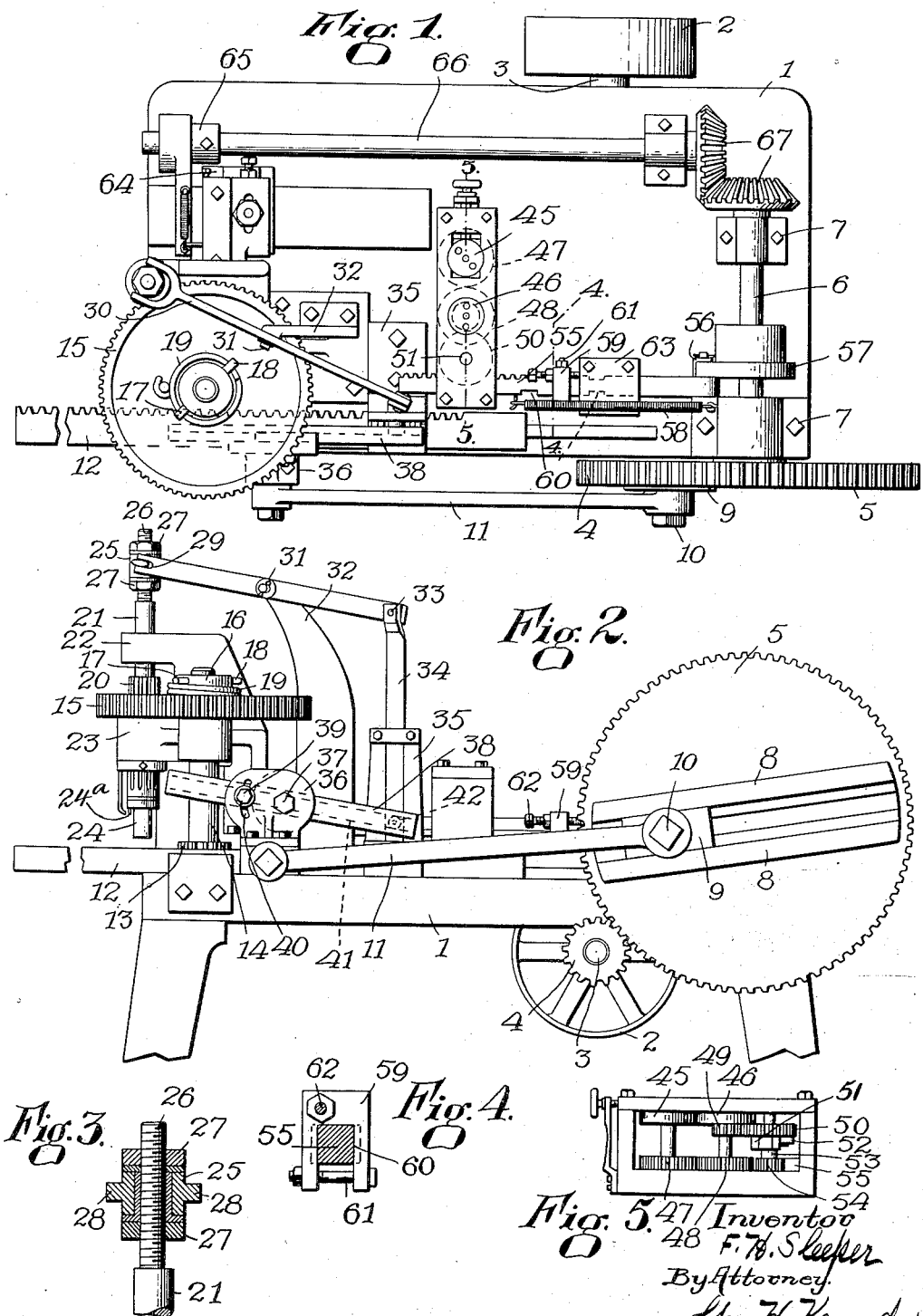

UNITED STATES PATENT OFFICE.

FRANK H. SLEEPER, OF WORCESTER, MASSACHUSETTS, ASSIGNOR TO SLEEPER & HARTLEY, INC., OF WORCESTER, MASSACHUSETTS, A CORPORATION OF MASSACHUSETTS.

SPRING-WINDING MACHINE.

1,368,297.   Specification of Letters Patent.   Patented Feb. 15, 1921.

Application filed May 24, 1918. Serial No. 236,305.

*To all whom it may concern:*

Be it known that I, FRANK H. SLEEPER, a citizen of the Dominion of Canada, residing at Worcester, in the county of Worcester and Commonwealth of Massachusetts, United States of America, have invented a new and useful Improvement in Spring-Winding Machines, of which the following, together with the accompanying drawings, is a specification.

The present invention relates to a machine for winding wire springs, and the invention resides in certain improvements upon the machine shown and described in Letters Patent of the United States No. 1,045,900, granted to me December 3, 1912.

In common with the machine of the aforesaid Letters Patent, the machine of my present invention contemplates the production of jig springs, and the like, from a continuous supply of wire; the improvements constituting the present invention are fully set forth in the following description, reference being had in this connection to the accompanying drawings, in which—

Figure 1 is a plan view of a spring winding machine embodying said improvements.

Fig. 2 is a side view of said machine.

Fig. 3 is a central vertical sectional view of the upper end an arbor carrying spindle.

Fig. 4 is a fragmentary sectional view on the line 4—4 of Fig. 1, and

Fig. 5 is a fragmentary sectional view on the line 5—5 of Fig. 1.

Like reference characters refer to like parts in the different figures.

As herein shown, the operative parts of the machine are mounted upon a supporting stand 1. Power is applied to the machine through a belt pulley 2 carried upon one end of a driving shaft 3. Upon the opposite end of the shaft 3 is a pinion 4 which is in mesh with a gear 5, secured on the end of a shaft 6, the latter being journaled in suitable bearings 7, 7 carried by supporting stand 1. The face of gear 5 provides diametrical guideways 8, 8 for the adjustment therein of a head 9, the latter carrying a crank pin 10 which actuates, through a pivoted connecting rod 11, a sliding rack 12. The latter is guided in a horizontal path by suitable slideways on the supporting stand 1, the stroke thereof being variable at will by adjustment of the head 9 in the guideways 8, 8.

The teeth of rack 12 are in engagement with a pinion 13 on the lower end of a vertical shaft 14, so that the shaft is rotated in one direction or the other, corresponding to the direction of movement of the rack. At its upper end the shaft 14 is surrounded loosely by a gear 15, there being a clutch connection between the shaft and the gear, as described in my aforesaid Letters Patent, whereby rotation of said shaft in one direction is communicated to said gear. To this end the shaft 14 carries a clutching member 16, having a single tooth 17 adapted to engage a corresponding tooth or projection 18 formed on the gear 15. In one direction of rotation of the shaft 14, the gear 15 will rotate in unison therewith by the positive engagement of the clutch teeth 17 and 18. During the reverse movement of the shaft 14, the clutch teeth are yieldingly held in contact by a spring 19 connecting the clutch member 16 and the gear 15, for a purpose hereinafter described.

The gear 15 is in mesh with an elongated pinion 20, which is secured to a vertical spindle 21 slidably journaled in bearings 22 and 23. The lower end of said spindle is adapted for the attachment thereto of a spring winding arbor 24, substantially as described in my aforesaid Letters Patent. The upper end of spindle 21 is adapted for the adjustable attachment thereto of a non-rotating collar 25, and to this end said upper end is screw threaded as at 26, to receive stop nuts 27, 27 on opposite sides of said collar to hold the latter in any desired position of adjustment on said spindle. The collar 25 provides oppositely projecting pins 28 which are received in slots 29 of a bifurcated lever 30. The latter is pivoted at 31 to a fixed bracket 32 projecting upwardly from the supporting stand 1, and its other end is pivotally attached at 33 to a vertical sliding bar 34. Said bar 34 is guided in its vertical movement in a bracket 35, carried by the supporting stand 1.

Attached to the rack 12 so as to reciprocate in unison therewith is a member 36 through which passes a pivotal stud or bolt 37. The bolt 37 carries an arm 38 which is disposed on the rear side of the member 36. The arm 38 is adapted to occupy various positions of angular adjustment with respect to the member 36, said arm being movable about the axis provided by the bolt 37. To effect this adjustment, and to secure the arm in any desired position of adjustment, a second bolt 39 is secured to the arm, said bolt passing through a curved slot 40 in the member 36. It will thus be seen that by loosening the bolt 39, the angular position of the arm 38 may be changed; when the bolt 39 is tightened, said arm is held in the desired angular position.

The rear face of arm 38 is provided with a groove 41, and this groove receives a roller 42 which is secured on the opposing face of the bar 34. In this way the horizontal reciprocations of the member 36 are communicated to the bar 34, so as to reciprocate the latter vertically; the amount of this vertical reciprocation is dependent upon the angular adjustment of the arm 38. That is to say, when the arm 38 is in a position nearly approaching the horizontal, the bar 34 will only move a short distance; on the other hand, when the angularity of the arm 38 is increased, the bar 34 will have a longer stroke, and the vertical movement of spindle 21 will be correspondingly increased.

In the operation of the machine, the wire to be wound is taken from a reel, not shown, in a continuous length, and fed between straightening rolls, not shown, in a manner similar to that shown in my aforesaid Letters Patent No. 1,045,900. The wire is fed between feed rolls 45 and 46 which are carried on vertical spindles having intermeshing gears 47 and 48. One of the feed roll spindles has a pinion 49 which is in mesh with a gear 50 having attached thereto a ratchet wheel 51. The latter is engaged by a pawl 52 on a vertical spindle 53, said spindle carrying a pinion 54 which is in mesh with a sliding rack 55. The rack 55 is provided with a cam roll 56, which is held in contact with a cam 57 on shaft 6 by means of a spring 58; the reciprocations of the rack 55 in response to the rotation of cam 57 impart an intermittent operation to the feed rolls 45 and 46, in the manner set forth in my aforesaid Letters Patent No. 1,045,900. The cam 57 moves the rack to the left, Fig. 1, and the spring 58 accomplishes the return movement of said rack. The length of this return movement, and consequently the length of the left hand movement is determined by an adjustment plate 59, Fig. 4, which is adapted to embrace the rack 55 at one or the other of a plurality of notched portions 60. Said plate 59 is bifurcated, as shown in Fig. 4, the separate ends thereof being drawn together by a bolt 61. When it is desired to shift the plate from one notched portion 60 to another in order to vary the stroke of the rack, the bolt 61 is loosened and the plate 59 can thus be moved to another position of adjustment. Said plate 59 carries an adjustable screw 62, the end of which projects toward a fixed bearing member 63 through which the rack 55 passes. The movement of the plate 59 provides an approximate adjustment for the stroke of the rack 55, and the screw 62 provides a fine adjustment, in all positions of said plate 59; the contact of screw 62 with the bearing 63 limits the reverse movement of the rack and consequently determines the length of its left hand movement.

The machine provides a mechanism for cutting off the wire into the desired lengths, the same being operative upon the winding of each such length on the arbor 24; the cutting mechanism herein shown is the same as that provided in my aforesaid Letters Patent No. 1,045,900, and consists essentially of a reciprocating member 64, carrying a cutting bar, not shown, said member being operated by a cam 65 on a shaft 66 which is connected by bevel gearing 67 with the shaft 6. In the operation of winding a spring, the end of the wire is projected past the cutting mechanism and between the winding arbor 24 and its stud $24^a$, the latter being for the purpose of forming an arm at the end of the spring, as fully described in said prior Letters Patent. At the beginning of this winding operation, the spindle 21 may be assumed to be in its lowest position, due to the elevation of bar 34 by the movement of rack 12 to the right, Fig. 2. The rotation of the arbor 24 then winds the spring the desired number of coils during the upward movement of said arbor, which takes place upon the movement of rack 12 to the left, Fig. 2. The first coil of the spring is held upon the arbor between the stud $24^a$ and the surface of the arbor, and as the arbor gradually moves upwardly, due to the drawing down of bar 34, the wire is wound upon it in successive convolutions, with the distance between the convolutions governed by the previous adjustment of arm 38 in the member 36, as heretofore described. The upward movement of the arbor continues until a spring of the desired length is formed upon the arbor, and then the reverse or return movement of the arbor is begun, by the commencement of the right hand movement of rack 12. As soon as a slight recoil in the wound spring has taken place, due to the elasticity of the wire, the cutting member 64 is pushed forward by cam 65 and the spring is cut off from the continuous length of straight wire at the proper distance from the axis of the arbor, it being understood that the cutting mechanism is adjustable for this purpose, as described in said prior Letters Patent. The reverse movement of the arbor is continued, to bring the arbor and stud $24^a$ into the start of the winding position, in readiness for the feeding forward of the wire to form another spring, it being understood that the feed rolls 45 and 46 are properly timed for this purpose. The elasticity of the wound spring, which causes the slight recoil referred to above, separates the spring from the arbor and allows it to drop off into a suitable receptacle, not shown, as soon as the cutting mechanism has operated.

During the operation of winding, the arbor 24 is driven by the positive engagement of the clutch mechanism between the shaft 14 and the gear 15. During the reverse movement of the shaft 14, the clutch teeth 17 and 18 are held in contact by the spring 19, which connects the clutch member 16 and the gear 15. The clutch tooth 18 on the gear 15 follows the clutch tooth 17 on the clutch member 16 so that when the reverse movement of the spindle 21 is checked, any further movement of the shaft 14 would cause the teeth 17 and 18 to separate and the spring 19 to yield; this yielding clutch connection is precisely the same as that described in my aforesaid prior Letters Patent.

I claim,

1. In a machine of the class described, the combination with a winding arbor, of a reciprocating rack adapted to rotate said arbor, and a connecting means between said rack and said arbor, whereby the reciprocating movement of said rack will impart a longitudinal movement to said arbor and means for varying the longitudinal movement of said arbor independently of the movement of the rack.

2. In a machine of the class described, the combination with a winding arbor, of a reciprocating rack adapted to rotate said arbor, a connecting means between said rack and said arbor for transmitting the reciprocations of said rack, whereby to move said arbor longitudinally, and means for adjusting said connecting means to vary the movement of said arbor.

3. In a machine of the class described, the combination with a winding arbor, of a reciprocating rack adapted to rotate said arbor, means operatively connected to said arbor to impart a longitudinal movement thereto, comprising a pivoted lever pivotally connected to a collar carried by said arbor and held from longitudinal movement thereon, and means connected with said rack for imparting an angular movement to said lever.

4. In a machine of the class described, the combination with a winding arbor, of a reciprocating rack adapted to rotate said arbor, a slotted member adjustably carried by said rack, and means coöperating with the slot in said member for transmitting a reciprocating movement to said arbor.

5. In a machine of the class described, the combination with a winding arbor, of a reciprocating rack adapted to impart rotation to said arbor, a slotted member carried by said rack, means for adjusting the angular position of said member with respect to said rack, and means operatively connected to said slotted member for imparting longitudinal movement to said arbor.

6. In a machine of the class described, wire feeding means, a reciprocating rack for actuating said wire feeding means, provided with spaced notches, a bifurcated plate embracing said rack at its notched portion, means for clamping said plate on the notched portion of the rack, a fixed stop, and an adjusting screw carried by said plate and contacting with said fixed stop.

Dated this sixteenth day of May, 1918.

FRANK H. SLEEPER.

Witnesses:
  GEORGE D. HARTLEY,
  WILLIAM H. BLOUNT.